United States Patent
Arora et al.

(10) Patent No.: US 10,462,146 B2
(45) Date of Patent: Oct. 29, 2019

(54) LEVERAGING A REGULATED NETWORK TO ENABLE DEVICE CONNECTIVITY IN A RESTRICTED ZONE

(71) Applicant: International Business Machines Corporation, Armonk, NY (US)

(72) Inventors: Rohan R. Arora, Chappaqua, NY (US); Christian Eggenberger, Wil (CH); Sinem Guven, New York, NY (US); Jens Rathgeber, Glashuetten (DE)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 15/477,280

(22) Filed: Apr. 3, 2017

(65) Prior Publication Data
US 2018/0288056 A1    Oct. 4, 2018

(51) Int. Cl.
| H04L 29/06 | (2006.01) |
| H04W 4/80 | (2018.01) |
| G06N 20/00 | (2019.01) |
| H04W 12/08 | (2009.01) |
| H04L 12/26 | (2006.01) |

(52) U.S. Cl.
CPC .......... H04L 63/101 (2013.01); G06N 20/00 (2019.01); H04L 63/0492 (2013.01); H04W 4/80 (2018.02); H04W 12/08 (2013.01); H04L 43/0876 (2013.01)

(58) Field of Classification Search
CPC . H04L 63/101; H04L 63/306; H04L 43/0876; H04L 43/0811; H04L 29/06
USPC ............................................................. 726/4
See application file for complete search history.

(56) References Cited

U.S. PATENT DOCUMENTS

| 7,707,297 | B2 * | 4/2010 | Haddad ................... H04L 47/11 709/226 |
| 7,907,901 | B1 | 3/2011 | Kahn et al. |
| 8,963,806 | B1 | 2/2015 | Starner et al. |
| 9,112,701 | B2 | 8/2015 | Sano et al. |
| 9,137,742 | B1 | 9/2015 | Zhu et al. |
| 2009/0068984 | A1 | 3/2009 | Burnett |
| 2013/0185407 | A1 | 7/2013 | Kaminsky et al. |
| 2014/0337634 | A1 | 11/2014 | Starner et al. |
| 2017/0026444 | A1 * | 1/2017 | Bhat ...................... H04L 65/602 |
| 2018/0227187 | A1 * | 8/2018 | Duvanenko ......... H04L 41/0896 |

\* cited by examiner

*Primary Examiner* — Evans Desrosiers
(74) *Attorney, Agent, or Firm* — L. Jeffrey Kelly; Ryan, Mason & Lewis, LLP (57) ABSTRACT

A component of an environment having available bandwidth for performing a task is located. Authorization to connect a device associated with the task to the component is granted. In response to determining that a set of one or more conditions are met, the device is connected to the component. The connection provides network connectivity to the device via the component.

20 Claims, 6 Drawing Sheets

LEVERAGING A REGULATED NETWORK TO ENABLE DEVICE CONNECTIVITY IN A RESTRICTED ZONE

BACKGROUND

Users who want to utilize a device, such as a smartphone or head mounted display (e.g., smart glasses), inside of a restricted area (e.g., a data center, a Faraday cage, an electromagnetic/radio-frequency interference (EMI/RFI) shielded room, an aircraft or an underwater submarine), often fail to do so due to insufficient connectivity or security regulations. For example, data centers may offer limited or no connectivity to devices other than devices of the data center inventory, which may be due to, for example, limited or no WiFi coverage or security guidelines.

SUMMARY

Embodiments provide techniques for enabling network connectivity of a device in an environment.

In one embodiment, a method comprises the following steps. A component of an environment having available bandwidth for performing a task is located. Authorization to connect a device associated with the task to the component is granted. In response to determining that a set of one or more conditions are met, the device is connected to the component. The connection provides network connectivity to the device via the component. The steps are implemented via at least one processor operatively coupled to a memory.

In another embodiment, an apparatus comprises at least one processor and a memory operatively coupled to the processor. The processor is configured to: locate a component of an environment having available bandwidth for performing a task; grant authorization to connect a device associated with the task to the component; and in response to a determination that a set of one or more conditions are met, connect the device to the component. The connection provides network connectivity to the device via the component.

In yet another embodiment, a system comprising one or more components of an environment, a device, and at least one processing device comprising a processor operatively coupled to a memory. The processing device is configured to: locate a component of an environment having available bandwidth for performing a task; grant authorization to connect a device associated with the task to the component; and in response to a determination that a set of one or more conditions are met, connect the device to the component. The connection provides network connectivity to the device via the component.

Advantageously, illustrative embodiments provide techniques for providing connectivity to a device by leveraging a component of an environment, such as an IT component of a datacenter. While conventional connectivity approaches require hard coded information and/or human intervention, these illustrative embodiments provide a cognitive computing approach to providing connectivity to a device. The illustrative embodiments may also consider whether a user of the device is allowed to connect to the component. The illustrative embodiments may also provide for dynamic monitoring of the component after connection to the device in order to modify bandwidth allocation and/or disconnect the device.

These and other exemplary embodiments of the invention will be described in or become apparent from the following detailed description of exemplary embodiments, which is to be read in connection with the accompanying drawings.

DETAILED DESCRIPTION

Illustrative embodiments will be described below for providing connectivity (e.g., Internet connectivity) to a device within an environment by connecting the device to a component of the environment. While illustrative techniques described herein are particularly well-suited for pairing the device to the component using Bluetooth technology, it is to be understood that embodiments are not intended to be limited to Bluetooth pairing.

The illustrative embodiments described below may be implemented in an augmented reality system. In contrast to virtual reality, which replaces a real-world environment with a computer-generated simulated environment, augmented reality augments or supplements the real-world environment with computer-generated inputs (e.g., sound, video, graphics, and geolocation data). For example, devices, such as mobile devices (e.g., smartphones and tablets) or head-mounted display devices (e.g., smartglasses), may be used in an augmented reality system to display the augmented reality to a user.

Figure 1:
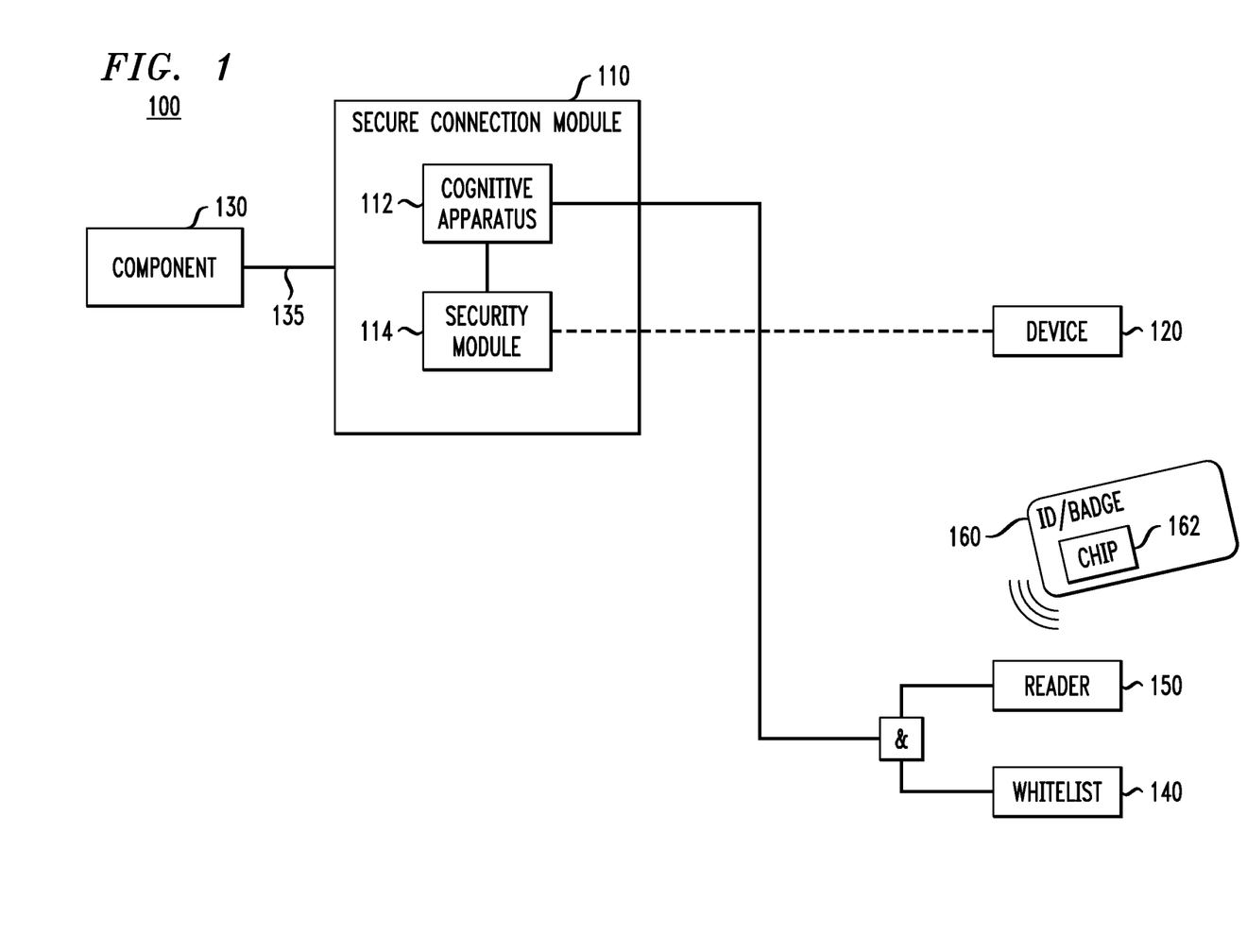
FIG. 1 illustrates a block diagram of a system with which one or more embodiments of the invention are implemented.

FIG. 1 illustrates a block diagram of a system environment 100. In one embodiment, environment 100 is a restricted area. Examples of a restricted area include, but are not limited to, a datacenter, a Faraday cage, an EMI/RFI-shielded room, an aircraft and an underwater submarine.

Environment 100 comprises secure connection module (SCM) 110. In one embodiment, and as shown, SCM 110 comprises cognitive apparatus 112 and security module 114. Using cognitive apparatus 112 and security module 114, SCM 110 is configured to provide connectivity to a device, such as device 120 by securely connecting device 120 to a component of environment 100. In one embodiment, device 120 is a mobile device, such as a smartphone or tablet. In another embodiment, device 120 is a head-mounted display device, such as smartglasses. Device 120 may be implemented in an augmented reality system.

In order to provide connectivity to device 120, SCM 110 is configured to determine network bandwidth requirements for device 120 to perform a task, and locate at least one component of environment 100 having available bandwidth for performing the task. The task may be a task performed by a user associated with device 120. For example, the task may be a repair task and the user may be a technician. The bandwidth required to perform the task may be determined based on a complexity of an action plan. For example, a more complex action plan will likely need more instructions and/or visuals. The bandwidth required to perform the task may be further determined based on a user profile associated with the user. The user profile may include skill and experience of the user, such as training courses and years in service for the at least one component.

As shown in FIG. 1, the at least one located component is component 130. SCM 110 is connected to component 130 via connection 135. In one embodiment, connection 135 is an Ethernet connection. For example, SCM 110 may be connected to component 130 via a regular network cable. However, any type of connection may be used to connect SCM 110 and component 130, in accordance with the embodiments described herein. Further details regarding locating a component having available bandwidth for performing a task will be discussed below with reference to FIG. 3.

SCM 110 is configured to grant authorization to connect device 120 to component 130. In one embodiment, SCM 110 is configured to grant authorization to connect device 120 to component 130 by: authorizing device 120, a user associated with device 120, and component 130; determining that component 130 is available for connection to device 120; and determining that the user is within a given distance of component 130 to permit the connection to component 130.

The device-based authorization may be implemented by determining that device 120 is an approved device. For example, SCM 110 may receive whitelist 140, and determine that device 120 is on whitelist 140. As is known in the art, a whitelist is a list comprised of recognized entities. Security exceptions may be based on the whitelist. In one embodiment, whitelist 140 is a media access control (MAC) address whitelist. MAC address whitelists are lists comprised of recognized MAC addresses, thereby allowing recognition or access to a device based on its MAC address.

The user-based authorization may be implemented by determining that a user associated with device 120 has access rights in environment 100. In one embodiment, radio-frequency identification (RFID) technology is utilized to determine that the user has access rights.

As is known in the art, RFID technology is used to uniquely identify an item using radio waves. Specifically, an RFID system may comprise a tag and a reader. The reader sends out a signal to the tag, and the tag responds to the signal by sending its unique information back to the reader. In one embodiment, the RFID technology comprises near field communication (NFC) technology. As is known in the art, NFC is a set of communication protocols that enables devices to establish wireless communication within a short-range (i.e., near field) distance of each other.

RFID technology may be used to authorize a user associated with device 120 as follows: RFID reader ("reader") 150 is configured to send a signal to chip 162 embedded in ID/badge 160 associated with the user. Chip 162 is configured to send its stored information back to reader 150. If the information sent back to reader 150 validates that the user has access rights in environment 100, the user is authorized and is determined to have access rights in environment 100.

The component-based authorization is implemented by dynamically monitoring one or more factors. The one or more factors may include, for example, system availability, performance and criticality. These factors may impact the ability of component 130 to share its connectivity. For example, patterns around which days and/or times determine based on a calendar, system performance data, etc. when component 130 is critical may be monitored to determine if sharing would be appropriate. If it is determined that component 130 can support connectivity to device 120, then permission to connect device 120 to component 130 is granted. Accordingly, even if device 120 and the user associated with device 120 are authorized, SCM 110 may still deny permission to connect to component 130 based on current circumstances surrounding component 130.

In one embodiment, SCM 110 is configured to determine that the user is within the given distance of component 130 by determining that chip 162 is within the given distance of component 130. Thus, if the user is outside of the given distance, permission to connect device 120 and component 130 is denied.

In one embodiment, after permission to connect device 120 to component 130 is granted, SCM 110 is configured to determine that a set of one or more conditions are being met. The set of one or more conditions may include, for example, the criticality of component 130. Machine learning may be used by SCM 110 to learn of the set of one or more conditions required to permit connectivity. For example, SCM 110 may learn the criticality of component 130 in specific circumstances over time.

Once it is determined that the set of one or more conditions are met, SCM 110 is configured to connect device 120 to component 130. In one embodiment, SCM 110 acts as a bridge or interceptor between device 120 and component 130. That is, device 120 and component 130 are indirectly connected with SCM 110 acting as an intermediary device. Further details regarding the connection of device 120 to component 130 are provided below with reference to FIG. 5.

In one embodiment, the connection is a Bluetooth pairing made using Bluetooth technology. In another embodiment, the connection is made using optical wireless communication technology. For example, the connection may be made using visible light communication (VLC) technology. The implementation of Bluetooth technology and/or optical wireless communication technology is known in the art, and further details regarding their implementation will not be provided herein.

In one embodiment, SCM 110 is configured to dynamically adjust bandwidth allocation to component 130. The dynamic adjustment of the bandwidth allocation may be based on, for example, the task being performed, system performance (e.g., bandwidth availability), etc. For example, SCM 110 may track bandwidth usage of the SCM during the performance of the task.

SCM 110 is configured to dynamically evaluate whether or not to disconnect the device from the component. For example, SCM 110 may dynamically monitor the one or more factors, verify the presence of ID/badge 160 via RFID technology, etc. In one embodiment, SCM 110 is configured to disconnect device 120 from component 130 in response to a determination that the user is outside of the given distance of component 130.

Figure 2:
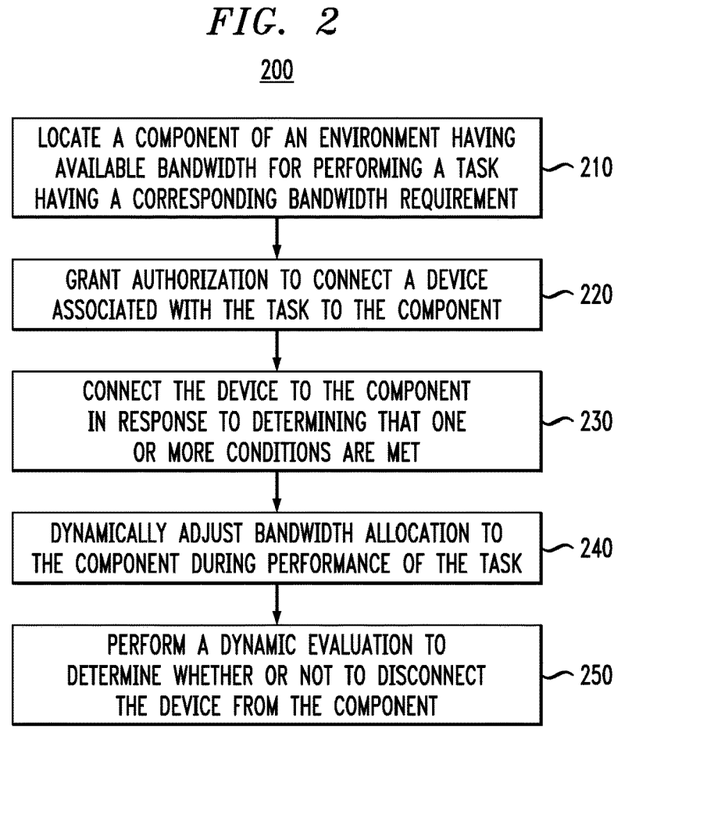
FIG. 2 illustrates an overview of a process for connecting a device to a component of an environment according to an embodiment of the invention.

FIG. 2 illustrates a flowchart 200 of an exemplary process for connecting a device to a component of an environment. In this illustrative embodiment, it is assumed that the process is being performed by an intermediary device of the environment configured to provide a secure connection between the device and the component, such as SCM 110 of FIG. 1.

At step 210, a component of an environment having available bandwidth for performing a task having a corresponding bandwidth requirement is located. Further details regarding locating the component of the environment are provided below with reference to FIG. 3.

At step 220, authorization to connect a device to the component is granted. In one embodiment, the device is a mobile device, such as a smartphone or tablet. Further details regarding granting permission to connect the device to the component are provided below with reference to FIG. 4.

At step 230, the device is connected to the component in response to determining that a set of one or more conditions are met. As discussed in FIG. 1, the set of one or more conditions may comprise, for example, the criticality of the component, and machine learning may be used to learn of the set of one or more conditions. For example, the criticality of the component in specific circumstances (e.g., weekdays, end of month, etc.) may be learned. In one embodiment, the device is connected indirectly to the component via the intermediary device. That is, the intermediary device may act as a bridge or interceptor between the device and the component in order to provide the secure connection. Further details regarding connecting the device to the component are provided below with reference to FIG. 5.

At step 240, bandwidth allocation to the component is dynamically adjusted (e.g., regulated) during the performance of the task. The dynamic adjustment of the bandwidth allocation may be based on, for example, bandwidth usage and bandwidth availability during the performance of the task. For example, high resolution video data will require more bandwidth than plain text data (e.g., passwords or commands). Bandwidth usage during the performance of the task may be tracked. In one embodiment, step 240 comprises drawing inferences from past bandwidth usage data. Thus, the bandwidth usage being tracked during the performance of the task may be stored and used to improve future bandwidth allocation adjustments. Thus, the bandwidth allocation adjustment may utilize machine learning techniques. In one embodiment, the device may be adjusted to optimize bandwidth allocation during performance of the task. For example, in the case of a camera associated with the device, if it is determined that the component requires more bandwidth, a message may be sent to the device to adjust camera settings (e.g., camera resolution) in order to conserve component bandwidth. Accordingly, bandwidth allocation may be dynamically adjusted based on one or more of bandwidth usage during the performance of the task and bandwidth availability of the component during the performance of the task.

At step 250, a dynamic evaluation is performed to determine whether or not to disconnect the device from the component. Details regarding the dynamic evaluation are discussed above in FIG. 1.

Figure 3:
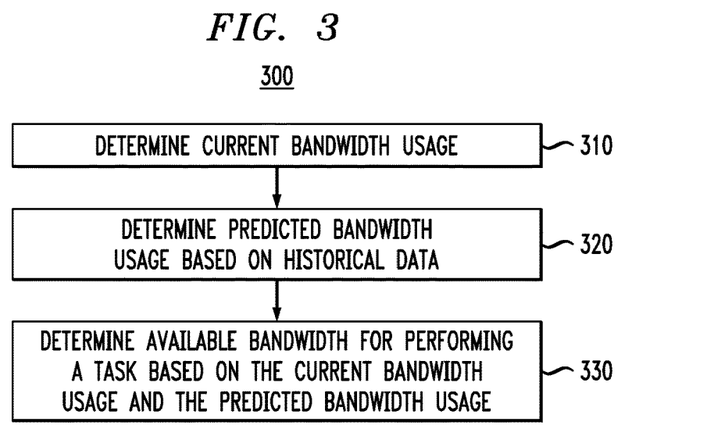
FIG. 3 illustrates a process for locating a component of an environment having available bandwidth for performing a task according to an embodiment of the invention.

FIG. 3 illustrates a flowchart 300 of an exemplary process for locating a component of an environment having available bandwidth for performing a task.

At step 310, current bandwidth usage is determined. In one embodiment, the current bandwidth usage is current non-SCM bandwidth usage.

At step 320, predicted bandwidth usage is determined based on historical data. In one embodiment, the predicted bandwidth usage is predicted non-SCM bandwidth usage. Determining the predicted non-SCM bandwidth usage may comprise utilizing machine learning technology. The historical data may comprise, for example, past non-SCM bandwidth usage data.

At step 330, available bandwidth for performing a task is determined based on the current and predicted bandwidth usage.

Figure 4:
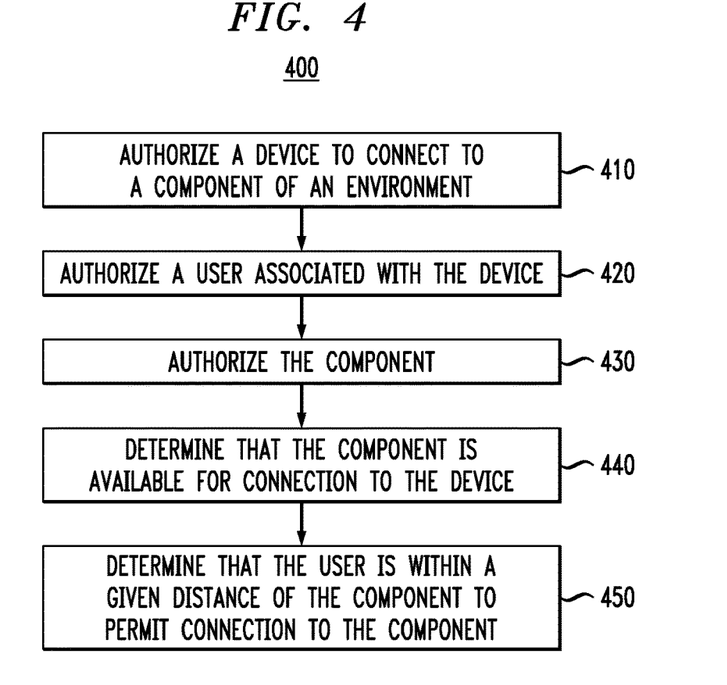
FIG. 4 illustrates a process for granting permission to connect a device to a component of an environment according to an embodiment of the invention.

FIG. 4 illustrates a flowchart 400 of an exemplary process for granting authorization to connect a device to a component of an environment.

At step 410, a device attempting to connect to a component of an environment is authorized. In one embodiment, step 410 comprises determining that the device is an approved device, such as by determining that the device is on a whitelist. For example, it may be determined that a MAC address associated with the device is on a MAC address whitelist.

At step 420, a user associated with the device is authorized. In one embodiment, step 420 comprises determining that the user has access rights in the environment. For example, RFID technology (e.g., NFC technology) may be employed to authorize the user, as discussed above in FIG. 1.

At step 430, the component is authorized. In one embodiment, step 430 comprises determining that the component can support device connectivity. For example, one or more factors that may impact the ability of the component to share its connectivity, such as system availability, performance and criticality may be monitored to determine that the component can support device connectivity.

At step 440, it is determined that the component is available for connection to the device.

At step 450, it is determined that the user is within a given distance of the component to permit connection to the component. In one embodiment, step 450 comprises employing RFID technology (e.g., NFC technology), as discussed in FIG. 1. For example, it may be determined that a chip (e.g., RFID chip) is within the given distance of the component. Thus, if the user is outside of the given distance, connection between the device and the component 130 is denied.

Figure 5:
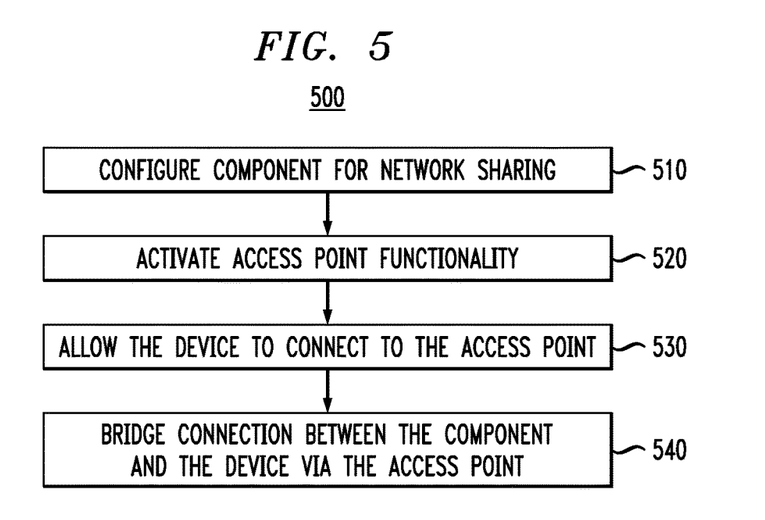
FIG. 5 illustrates a process for connecting a device to a component of an environment according to an embodiment of the invention.

FIG. 5 illustrates a flowchart 500 of an exemplary process for connecting a device to a component of an environment. In one embodiment, an intermediary device (e.g., SCM 100 of FIG. 1) coupled to the component (e.g., via Ethernet connection) is configured to perform the steps of FIG. 5. It is assumed that steps discussed in FIG. 5 are performed in response to determining that a set of one or more conditions for connecting the device to the component are met, as discussed in FIG. 2.

At step 510, the component is configured for network sharing. In one embodiment, configuring the component for sharing comprises issuing one or more commands. The one or more commands may include one or more internet protocol (IP) packet forwarding commands and/or one or more IP masquerading commands.

At step 520, access point functionality is activated. As is known in the art, an access point is a device that creates a wireless local area network (WLAN). The access point functionality is used to enable access to a wireless signal in a designated area. In one embodiment, step 520 comprises creating an interface for Bluetooth connectivity. Activating access point functionality in accordance with the embodiments described herein is known in the art, and further details regarding activating access point functionality will not be provided herein.

At step 530, the device is allowed to connect to the access point and, at step 540, a connection is bridged between the component and the device via the access point. That is, the access point acts as a bridge or interceptor in order to provide an indirect connection between the device and the component. The connection may employ, for example, Bluetooth or VLC technology.

The embodiments described herein combine device-based, user-based and system-based authorization, as well as cognitive capabilities, to leverage a system that already has network connectivity within an environment, such as a restricted area (e.g., datacenter). The device-based authorization involves establishing a communication link (e.g., via Bluetooth pairing or visible light communication) for approved devices, the user-based authorization involves verifying an approved user via, for example, RFID/NFC technology and may be continuously monitored to ensure that the approved user is nearby, and the component-based authorization involves dynamically monitoring component availability and criticality to determine if the component is able to share its connectivity, even if there is user and device authorization to access the component.

Figure 6:
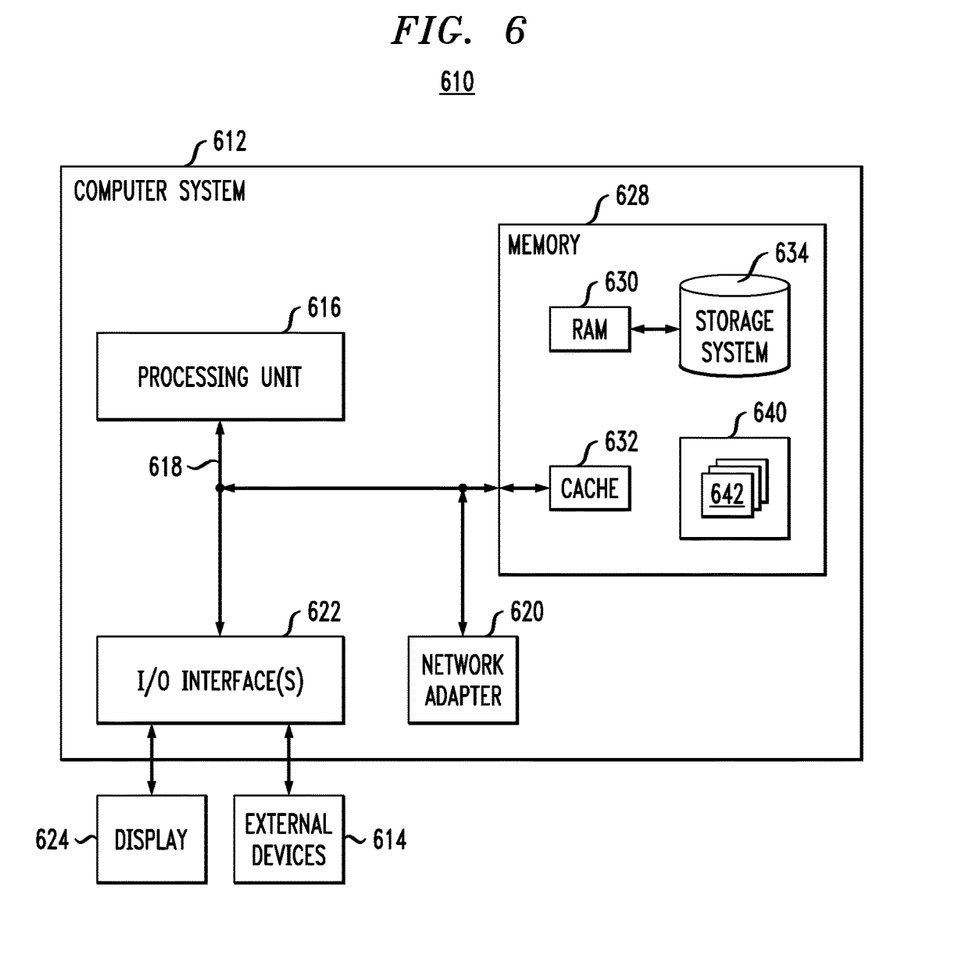
FIG. 6 illustrates a computer system in accordance with which one or more components/steps of techniques of the invention may be implemented according to an embodiment of the invention.

One or more embodiments can make use of software running on a computer or workstation. With reference to FIG. 6, in a computing node 610 there is a system/server 612, which is operational with numerous other general purpose or special purpose computing system environments or configurations. Examples of well-known computing systems, environments, and/or configurations that may be suitable for use with system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 600 can implement the architecture shown in computing node 610.

System/server 612 may be described in the general context of computer system executable instructions, such as program modules, being executed by a computer system. Generally, program modules may include routines, programs, objects, components, logic, data structures, and so on that perform particular tasks or implement particular abstract data types. System/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, system/server 612 is shown in the form of a computing device. The components of system/server 612 may include, but are not limited to, one or more processors or processing units 616, system memory 628, and bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 612 typically includes a variety of computer system readable media. Such media may be any available media that is accessible by system/server 612, and it includes both volatile and non-volatile media, removable and non-removable media.

The system memory 628 can include computer system readable media in the form of volatile memory, such as random access memory (RAM) 630 and/or cache memory 632. System/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces.

As depicted and described herein, memory 628 may include at least one program product having a set (e.g., at least one) of program modules that are configured to carry out the functions of embodiments of the invention. A program/utility 640, having a set (at least one) of program modules 742, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

System/server 612 may also communicate with one or more external devices 614 such as a keyboard, a pointing device, an external data storage device (e.g., a USB drive), display 624, one or more devices that enable a user to interact with system/server 612, and/or any devices (e.g., network card, modem, etc.) that enable system/server 612 to communicate with one or more other computing devices. Such communication can occur via I/O interfaces 622. Still yet, system/server 612 can communicate with one or more networks such as a LAN, a general WAN, and/or a public network (e.g., the Internet) via network adapter 620. As depicted, network adapter 620 communicates with the other components of system/server 612 via bus 618. It should be understood that although not shown, other hardware and/or software components could be used in conjunction with system/server 612. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
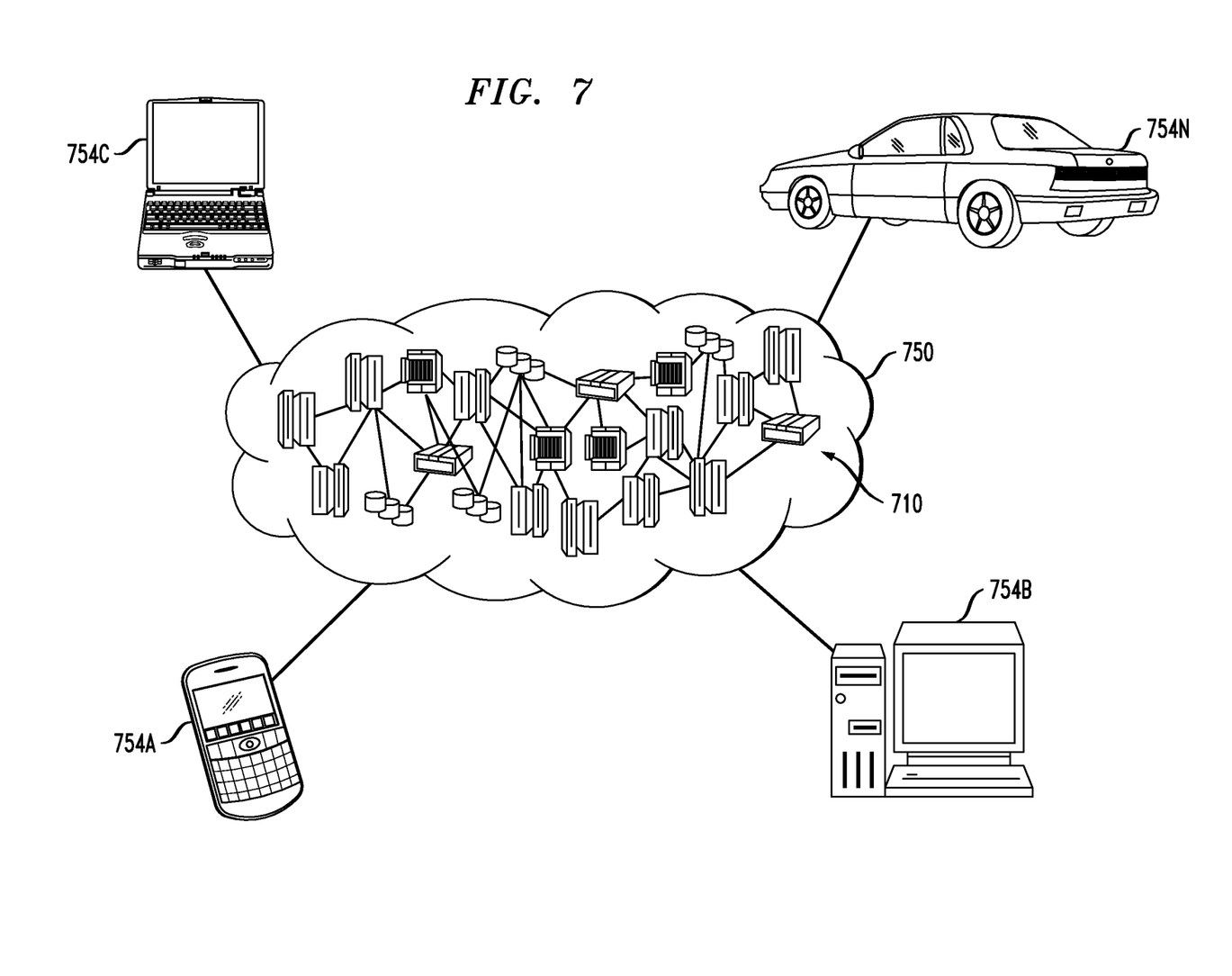
FIG. 7 illustrates a cloud computing environment according to an embodiment of the invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 710 and cloud computing environment 750 can communicate with any type of computerized device over any type of network and/or network addressable connection (e.g., using a web browser).

Figure 8:
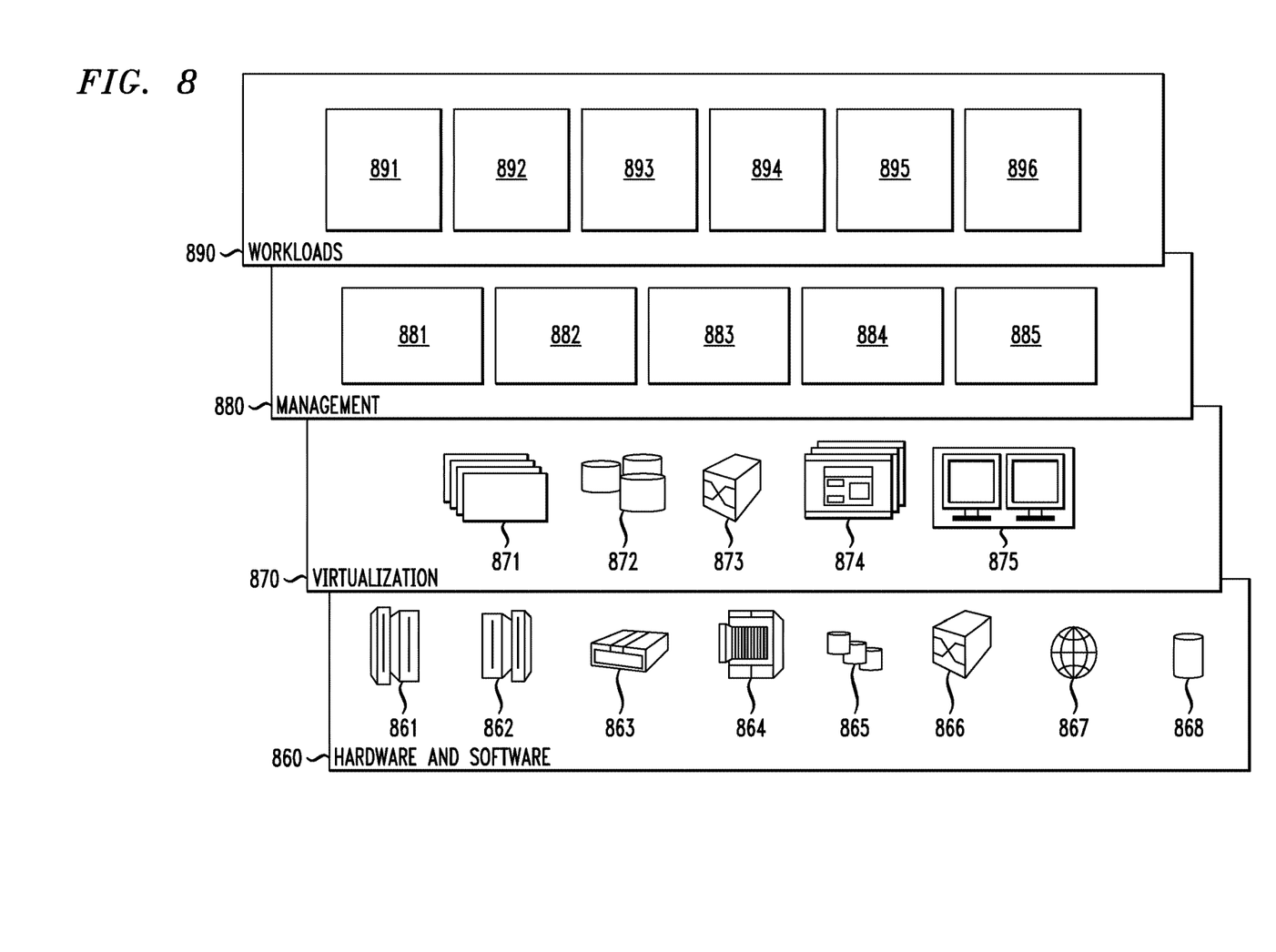
FIG. 8 illustrates abstraction model layers according to an embodiment of the invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: component location 891; authorization granting 892; data analytics processing 893; network connectivity assessment 894; bandwidth allocation assessment 895; and ameliorative/corrective/remedial action implementation 896, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   locating a component of an environment having available bandwidth for performing a task;
   granting authorization to connect a device associated with the task to the component, wherein granting authorization to connect the device to the component comprises:
      authorizing the device to connect to the component by determining that the device is an approved device;
      authorizing a user associated with the device by determining that the user has access rights in the environment;
      authorizing the component by determining that the component can support the connection to the device;
      determining that the component is available for connection to the device; and
      determining that the user is within a given distance of the component to permit connection to the component;
   in response to determining that a set of one or more conditions are met, connecting the device to the component, wherein the connection provides network connectivity to the device via the component; and
   dynamically adjusting bandwidth allocation of the component during the performance of the task based on one or more of bandwidth usage and bandwidth availability of the component;
   wherein locating the component further comprises:
      determining current bandwidth usage;
      determining predicted bandwidth usage based on historical data; and
      determining the available bandwidth based on the current bandwidth usage and the predicted bandwidth usage; and
   wherein the steps of the method are implemented via at least one processor operatively coupled to a memory.

2. The method of claim 1, further comprising calculating a bandwidth requirement for performing the task based at least in part on one or more of a complexity of the task and a profile corresponding to a user associated with the device.

3. The method of claim 1, wherein authorizing the device comprises determining that the device is comprised in a whitelist.

4. The method of claim 1, wherein authorizing the user comprises employing radio-frequency identification (RFID) technology.

5. The method of claim 1, wherein authorizing the component comprises monitoring one or more factors associated with the component, the one or more factors comprising one or more of availability, performance and criticality, and wherein the determination that the component can support connectivity to the device is based on the one or more factors.

6. The method of claim 1, wherein determining that the user is within the given distance of the component comprises employing radio-frequency identification (RFID) technology.

7. The method of claim 1, wherein the set of one or more conditions comprise a criticality of the component in one or more circumstances.

8. The method of claim 7, wherein the one or more circumstances comprise temporal circumstances.

9. The method of claim 1, wherein the set of one or more conditions are learned using machine learning.

10. The method of claim 1, wherein connecting the device to the component further comprises:
   configuring the component for network sharing by issuing one or more commands;
   activating access point functionality; and
   allowing the component to connect to the user device.

11. The method of claim 1, wherein the connection comprises at least one of a Bluetooth connection and a visible light connection (VLC).

12. The method of claim 1, further comprising performing a dynamic evaluation to determine whether or not to disconnect the device from the component.

13. The method of claim 1, wherein the device comprises one of a mobile device and a head-mounted display device.

14. An article of manufacture comprising a non-transitory processor-readable storage medium having encoded therein executable code of one or more software programs, wherein the one or more software programs when executed by the one or more processors implement the steps of:
   locating a component of an environment having available bandwidth for performing a task;
   granting authorization to connect a device associated with the task to the component, wherein granting authorization to connect the device to the component comprises:
      authorizing the device to connect to the component by determining that the device is an approved device;
      authorizing a user associated with the device by determining that the user has access rights in the environment;
      authorizing the component by determining that the component can support the connection to the device;
      determining that the component is available for connection to the device; and
      determining that the user is within a given distance of the component to permit connection to the component;
   in response to determining that a set of one or more conditions are met, connecting the device to the component, wherein the connection provides network connectivity to the device via the component; and
   dynamically adjusting bandwidth allocation of the component during the performance of the task based on one or more of bandwidth usage and bandwidth availability of the component;
   wherein locating the component further comprises:

determining current bandwidth usage;
determining predicted bandwidth usage based on historical data; and
determining the available bandwidth based on the current bandwidth usage and the predicted bandwidth usage.

15. An apparatus, comprising:
at least one processor operatively coupled to a memory and configured to:
locate a component of an environment having available bandwidth for performing a task;
grant authorization to connect a device associated with the task to the component, wherein granting authorization to connect the device to the component comprises:
authorizing the device to connect to the component by determining that the device is an approved device;
authorizing a user associated with the device by determining that the user has access rights in the environment;
authorizing the component by determining that the component can support the connection to the device;
determining that the component is available for connection to the device; and
determining that the user is within a given distance of the component to permit connection to the component;
in response to a determination that a set of one or more conditions are met, connect the device to the component, wherein the connection provides network connectivity to the device via the component; and
dynamically adjust bandwidth allocation of the component during the performance of the task based on one or more of bandwidth usage and bandwidth availability of the component;
wherein locating the component further comprises:
determining current bandwidth usage;
determining predicted bandwidth usage based on historical data; and
determining the available bandwidth based on the current bandwidth usage and the predicted bandwidth usage.

16. The apparatus of claim 15, further comprising to calculate a bandwidth requirement for performing the task based at least in part on one or more of a complexity of the task and a profile corresponding to a user associated with the device.

17. The apparatus of claim 15, wherein authorizing the component comprises monitoring one or more factors associated with the component, the one or more factors comprising one or more of availability, performance and criticality, and wherein the determination that the component can support connectivity to the device is based on the one or more factors.

18. A system comprising:
one or more components of an environment;
a device; and
at least one processing device comprising a processor operatively coupled to memory and configured to:
locate a given component of the one or more components having available bandwidth for performing a task using the device;
grant authorization to connect the device to the component, wherein granting authorization to connect the device to the component comprises:
authorizing the device to connect to the component by determining that the device is an approved device;
authorizing a user associated with the device by determining that the user has access rights in the environment;
authorizing the component by determining that the component can support the connection to the device;
determining that the component is available for connection to the device; and
determining that the user is within a given distance of the component to permit connection to the component;
in response to a determination that a set of one or more conditions are met, connect the device to the component, wherein the connection provides network connectivity to the device via the component; and
dynamically adjust bandwidth allocation of the component during the performance of the task based on one or more of bandwidth usage and bandwidth availability of the component;
wherein locating the component further comprises:
determining current bandwidth usage;
determining predicted bandwidth usage based on historical data; and
determining the available bandwidth based on the current bandwidth usage and the predicted bandwidth usage.

19. The system of claim 18, further comprising to calculate a bandwidth requirement for performing the task based at least in part on one or more of a complexity of the task and a profile corresponding to a user associated with the device.

20. The system of claim 18, wherein authorizing the component comprises monitoring one or more factors associated with the component, the one or more factors comprising one or more of availability, performance and criticality, and wherein the determination that the component can support connectivity to the device is based on the one or more factors.

* * * * *